United States Patent [19]
Guarnaschelli

[11] 3,753,008
[45] Aug. 14, 1973

[54] MEMORY PRE-DRIVER CIRCUIT

[75] Inventor: Gianpiero Guarnaschelli, Milan, Italy

[73] Assignee: Honeywell Information Systems Italia, Caluso, Italy

[22] Filed: June 14, 1971

[21] Appl. No.: 152,930

[30] Foreign Application Priority Data

June 20, 1970 Italy .............................. 26313 A/70

[52] U.S. Cl. .................. 307/270, 307/213, 307/215, 307/237, 340/174 TB, 307/214

[51] Int. Cl. H03k 19/34, H03k 19/36, G11c 11/34

[58] Field of Search .................... 307/270, 215, 218, 307/213, 214, 237, 238, 299 A; 340/174

[56] References Cited

UNITED STATES PATENTS

| | | | |
|---|---|---|---|
| 3,588,851 | 5/1971 | Jordan, Jr. | 307/254 X |
| 3,440,440 | 4/1969 | Prohofsky et al. | 307/270 X |
| R26,082 | 9/1966 | Osborne | 307/215 X |
| 3,519,851 | 7/1970 | Groner | 307/270 X |
| 3,508,224 | 4/1970 | Putterman | 307/270 X |
| 3,025,411 | 3/1962 | Rumble | 307/270 X |
| 3,119,025 | 1/1964 | Lourie et al. | 307/270 X |
| 3,229,119 | 1/1966 | Bohn et al. | 307/215 X |
| 3,522,444 | 8/1970 | Lourie | 307/218 X |
| 3,538,353 | 11/1970 | Hanger | 307/218 X |
| 3,557,383 | 1/1971 | Wavre | 307/215 |
| 3,581,124 | 5/1971 | Flores | 307/270 X |
| 3,555,294 | 1/1971 | Treadway | 307/218 X |

OTHER PUBLICATIONS

Berding, "Complementary Output Circuit Using All NPN's"; IBM Tech. Discl. Bull., Vol. 6, No. 12, p. 28; 5/1964.

*Primary Examiner*—John W. Huckert
*Assistant Examiner*—L. N. Anagnos
*Attorney*—Fred Jacob, Ronald T. Reiling et al.

[57] ABSTRACT

Alow power dissipating monolithic integrated core memory driver circuit for driving memory line transistor switches. The circuit is supplied with two distinct voltage levels and a control circuit responsive to input signals for processing the proper voltage required to effect the selection of a memory line without overloading the integrated driver circuit.

10 Claims, 6 Drawing Figures

Gianpiero GUARNASCHELLI
INVENTOR

By [signature]
ATTORNEY

Gianpiero GUARNASCHELLI
INVENTOR.

By [signature]
ATTORNEY.

Gianpiero GUARNASCHELLI
INVENTOR

By [signature]
ATTORNEY

MEMORY PRE-DRIVER CIRCUIT

BACKGROUND OF THE INVENTION

This invention relates to selection circuits employed in magnetic memories for data-handling devices.

It is known that magnetic core memories are largely used in most electronic devices, whenever random access for writing in and reading out the data is required.

It is also known that in such magnetic memories the selection of the memory cell storing the required information is effected by sending current pulses on predetermined wires. This is executed by closing predetermined current switches, to connect at least a selected wire to a current pulse generator, in response to command signals for reading or for writing.

Usually, transistors are used to operate as switches, and these transistors must be capable of high operating speeds and suitable for controlling currents and power outputs appreciably higher than those usually encountered in the purely logical circuits.

Selector switches may be subdivided in two groups, that is, "source" switches and "sink" switches. The latter are usually connected to the ground, whereas the source switches may be subjected to appreciably high voltages with respect to the ground, and to the control signals, which are generally referred to the ground. This effect is due mainly to the reactive nature of the load, consisting of a memory line.

It follows therefore that particular circuits are needed for correctly using transistors as source switches, whereas this type of difficulty is not met in the use of transistors as sink switches.

It is known furthermore that source switches are mostly used in "floating" conditions: that is, base and emitter of the transistor are connected to the terminals of a secondary winding of a transformer, to whose primary the control signal is applied. The current induced in the secondary by the control signal drives the transistor into the conductive condition for the duration of a pulse.

It is further known, that electronic devices may now be implemented using integrated electronic circuits, and that these integrated circuits afford an appreciable savings in space, power and operating cost. There is a large variety of solid state integrated circuits but they may be grouped into a reduced number of standard families, according to comparable characteristics in feeding voltage requirement, noise immunity, and interconnection capability. One of the more generally used of these families is the one called TTL (Transistor-Transistor Logic).

However, the use of said integrated circuits for driving magnetic memories is limited by the need for transformers, which cannot be easily provided in integrated circuits, and further limited generally by the high voltage and large power dissipation requirements, which cannot be readily implemented with integrated circuits because of their size and structural limitations.

It has been recently proposed to implement in form of integrated circuits the selection switches of magnetic memories, and associated control circuitry, by using peculiar devices such as voltage limiters; that is, feedback circuits responsive to voltage variations at the switch terminals, for coherently adjusting the intensity of the command signals. Also, it has been proposed to use circuits for preventing the simultaneous operation of two or more switches in the same integrated circuit, to prevent excessive power dissipation and damage to the same.

However, the results obtained are not satisfactory, because those devices require a larger steady power consumption, which adversely affects the design economy of the power source. In addition, they introduce appreciable variation in the driving current, which should be constant and of a fixed value. Their operation is usually too near to the safe limit with respect to the ratings of maximum operating temperatures and power dissipation.

Because of the above mentioned factors circuits associated with magnetic memories are comparatively bulky, complicated and costly, and require auxiliary devices, such as power supplies, which are also bound to be bulky and costly. It may also be added that the comparatively large dimensions of the memory devices require longer connection leads, which introduce larger stray capacitance, unwanted coupling, propagation delays signal reflections, and other problems which limit performance efficiency.

SUMMARY OF THE INVENTION

Briefly, the invention herein disclosed comprises a low power dissipating monolithic integrated core memory driver circuit for driving source and sink memory line transistor switches. The circuit has separate means for applying two distinct voltage levels which are selected by a control circuit responsive to input signals. A low voltage level is utilized for maintaining the base of the source memory line transistor at ground potential; while a high voltage level is applied through a precision resistor external to the integrated circuit for maintaining the base of the source memory line transistor at a positive potential. The current is therefore limited in operation to a safe limit and causes no damage to the monolithic integrated circuit.

OBJECTS

It is an object therefore of the invention to provide an improved memory pre-driver circuit.

It is a further object of the invention to provide an improved magnetic-core memory pre-driver circuit utilizing integrated circuits.

It is still a further object of the invention to provide a core memory pre-driver circuit which will essentially obviate the hereinabove disadvantages.

It is yet another object of the invention to provide a circuit which is compatible with TTL standards.

It is still another object of the invention to provide a circuit which is capable of accepting input signals having voltage and power levels in accordance with TTL standards, and in response to these signals, connect an output terminal to ground or a null reference voltage, through a path having negligible resistances; or alternatively, to a voltage source through a predetermined resistance value.

It is yet another object of the invention to provide a circuit compatible with TTL standards and having an additional external path for connection to a voltage source through a resistance having specific characteristic values, not available with fully integrated circuits.

It is an additional object of the invention to provide a circuit having a unidirectional connection to an output terminal of a voltage source which connection limits the maximum voltage applied to the terminal, and wherein the connection is inoperative under normal conditions.

It is still an additional object of the invention to provide a circuit having means to admit two distinct levels of input voltage for minimizing the overall power dissipation of the circuit.

These objects and other advantages and features of the invention will become apparent from the following description of a preferred embodiment, and from the accompanying drawings.

DESCRIPTION OF A PREFERRED EMBODIMENT

General

Figure 1:
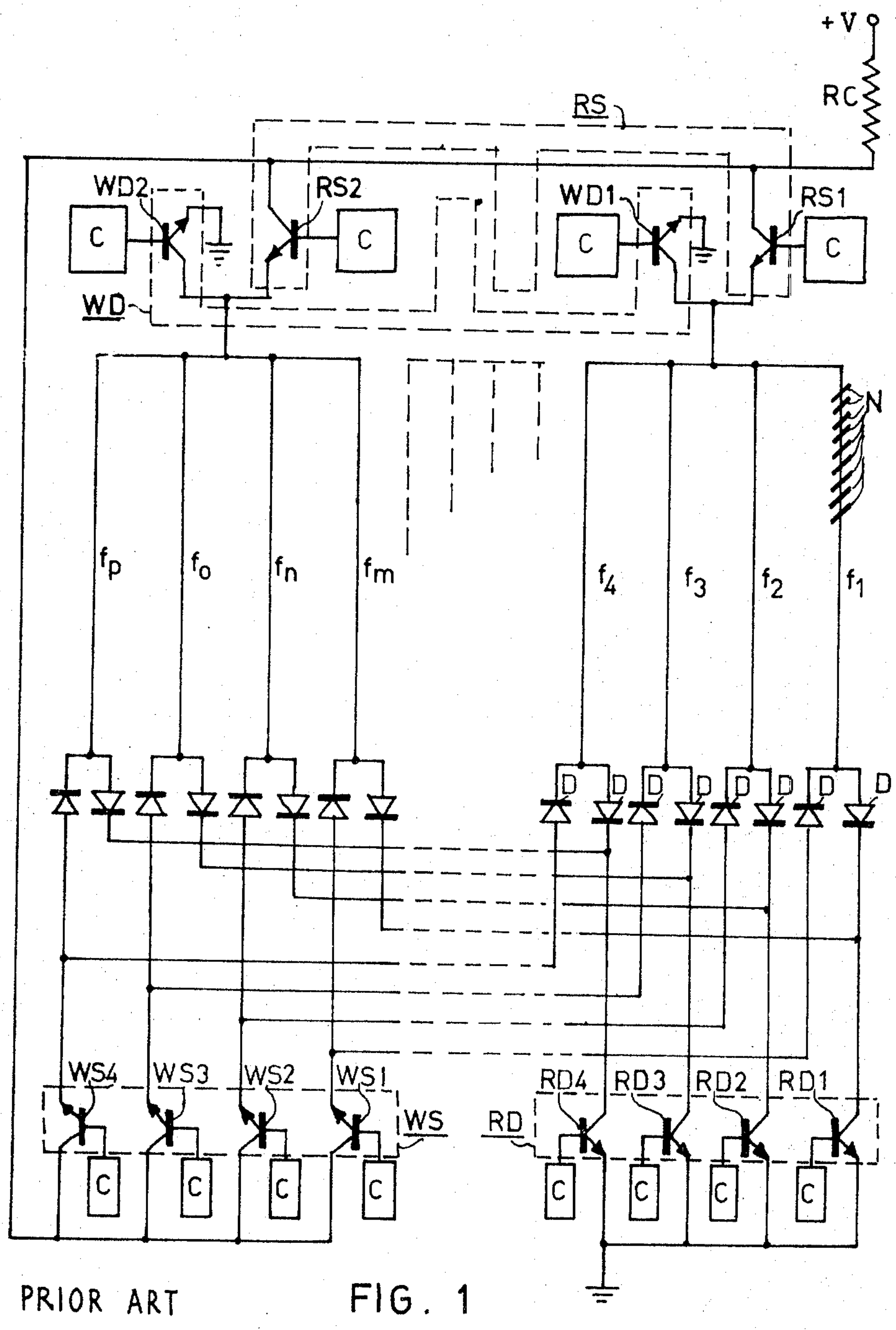
PRIOR ART FIG. 1
FIG. 1 is a schematic diagram of a prior art circuit showing selection lines in accordance with the state of the art of a portion of a magnetic core memory.

FIG. 1 shows schematically and in part a prior art selection arrangement of a portion of a magnetic memory plane.

It comprises for example a plurality of parallel conducting wires, $f_1, f_2, f_3, f_4 \ldots\ldots f_m, f_n, f_o, f_p$, etc. up to a total number of 256 wires. On each wire a suitable number N of magnetic cores are threaded; for example 32 is generally used making a total number of 9,192 cores in a plane.

A memory device comprises a plurality of such planes, either juxtaposed to form a three-dimensional array, or disposed in mutual adjacent relation on the same geometrical plane.

In addition to the wires $f_l$ to $f_p$ shown in FIG. 1, there are other selection wires, perpendicularly arranged to the former, such as for example one or more sense wires, and in some instances also inhibit wires. All these wires are not shown, as they are not essential in illustrating the instant invention; it will be sufficient to consider only the set of wires $f_l$ to $f_p$.

It is known that, to initiate a reading or a writing operation, a current pulse of predetermined value and direction must be sent on a wire selected from among the wires $f_l$ to $f_p$. To this purpose the memory is provided with a plurality of selector switches.

These switches, shown in FIG. 1, comprise transistors RS, RD, WS, and WD, and are divided in four groups as follows:

a. Read source switches RS
b. Read sink switches RD
c. Write source switches WS
d. Write sink switches WD.

The diodes D permit the predetermined current pulses to flow on a single wire f in either direction, according to whether the write or the read switches are operated.

The collectors of switches RS are connected to a suitable voltage source +V through a suitable resistor RC and the emitters of the same are connected to the common terminal of a group of wires $f$. For example, in FIG. 1, the switch RS1 is connected to a common terminal of the wires $f_1 f_2 f_3 f_4$. At the other end, the wires comprised in the same group are connected each to a collector of a different transistor of the RD group, i.e. to RD1, RD2, RD3, RD4; while the emitter of these transistors is connected to ground. It is apparent, therefore, that to select a memory line, for example $f_1$, in order to let a current pulse flow through the same, a transistor of the RS group (RS1) and a transistor of the RD group (RD1) must be made conductive. This happens during a read operation. If there are 256 memory lines and each group of lines contains 16 wires, 16 switches of the group RS and 16 switches of the group RD are needed, to complete each circuit. The same considerations are valid when a memory wire is selected for a write operation.

The transistors RS, RD, WS, and WD are controlled by appropriate drive circuits C, called "switch drivers", which can apply to the base of the corresponding transistor a suitable bias voltage to drive them into the "on" or into the "off" conditions.

Figure 2:
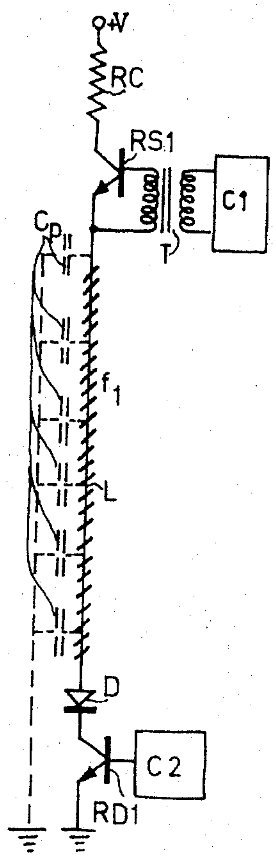
FIG. 2 PRIOR ART
FIG. 2 is a schematic diagram illustrating a prior art arrangement for driving a memory line according to the state of the art.

FIG. 2 shows one memory line of the memory shown on FIG. 1 in order to illustrate the path of the current flowing through the wire. The line is connected at one end to the emitter of transistor RS1, and at the opposite end to the collector of transistor RD1 through diode D. The collector of transistor RS1 is connected to a positive voltage source +V through resistor RC. The base and the emitter of transistor RS1 are connected together through the secondary winding of a transformer T, whose primary winding is connected to control circuit C1. The emitter of transistor RD1 is connected to ground and its base is connected to a control circuit C2.

The memory line $f_1$ has a relatively high inductance L, whereas its resistance is negligible because of RC: it is affected, in addition, by a stray capacitance to ground demonstrated by the dashed-line capacitors Cp. The operation of the circuit is as follows.

Transistors RS1 and RD1 are normally off.

In order to select line $f_1$, a current of suitable value is applied to the base of transistor RD1 by the control circuit C2, and thereby suitably biasing the base of RD1 with respect to the emitter thereof. At the same time, or after a suitable delay, the control circuit C1 applies to the primary of transformer T a current pulse which is transferred to the secondary and applied between base and emitter of transistor RS1 which therefore becomes conductive.

Due to the stray capacitance $C_p$, the current flowing through the collector of RS1 is limited by an impedance consisting substantially of RC and $C_p$ in series. Therefore the current reaches initially a considerable value, then decreases exponentially; this initial transient is very short, but sufficient to saturate transistor RS1. After a short interval, the effect of the stray capacities becomes negligible, and the current increases exponentially, until a steady state value is reached, said value being limited substantially by the resistance RC.

In this latter phase the time constant of the transient is, as known, L/RC.

Typical values for a memory line are for example:

$$L = 0.5\ \mu H, \quad RC = 54\ Ohm, \quad V = 24\ V.$$

and therefore $$L/RC = 0.5 \times 10^{-6}/54 = 10\ \text{nanoseconds}$$

and the steady state value of the current is V/RC = 400 mA.

Figure 3:
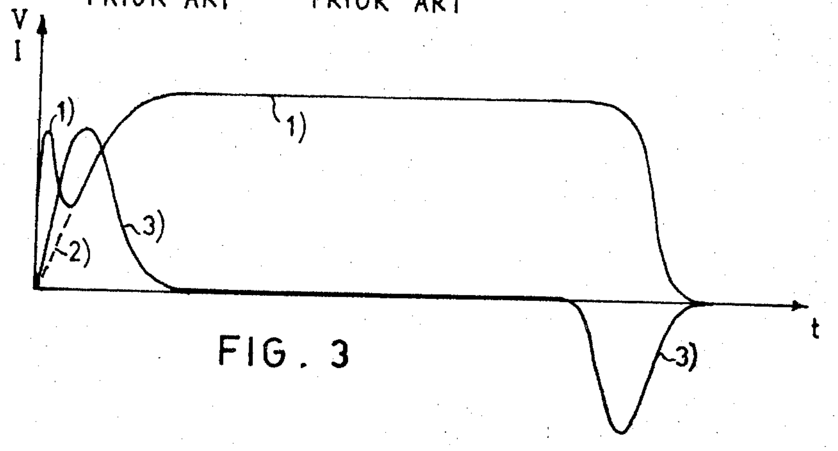
FIG. 3 is a graph of voltage/current vs. time which shows the waveforms of the driving currents in a memory line and of the associated voltage as a function of time.

The waveform of the current through the resistor RC is graphically shown as curve 1 on FIG. 3.

Also shown on FIG. 3 is a graph 3 which shows the variation of a counter - e.m.f. at the terminals of the line. It can readily be seen that there is a considerable swing towards the positive values, which is of the order of 20 or more volts, and explains the use made by the prior art circuits of the transformer T in the control device of the same.

This arrangement effectively permits the base potential to float together with the emitter potential, and the biasing voltage induced in the secondary of the transformer may be limited.

The current flowing through the line $f_1$ is, with the exception of the initial transient, the total collector current, that is, the current limited by resistor RC. During the initial transient, the collector current is higher than the effective line current, which is represented by the dashed line 2, but this has no effect on the steady conditions.

Using a stabilized power supply and a precision resistor of suitable value it is possible to obtain a steady state current of well defined value, not subject to change in time, and independent from the selected line.

When the transistor RS1 goes off because of a back-biasing pulse applied between the base and emitter, or simply by the extinction of the forward biasing pulse formerly applied, the line current diminishes and the line inductance generates a counter - e.m.f. bringing to a negative potential the emitter of RS1, as shown in curve 3) of FIG. 3, while the current goes to zero, as shown on curve 1 of FIG. 3. However, such counter - e.m.f. has no influence on the back-biasing of RS1, because the potential of the base follows the potential of the emitter.

Notwithstanding the undeniable advantages of the use of driving transformers, the need has arisen of using devices less bulky, and compatible with the structures commonly used for the purely logical circuits, and in particular with integrated circuits.

It has been proposed to drive directly the source switches as well as the sink switches, implementing both types of switches and the control circuits in integrated monolithic form.

This approach to the problem is for example described in the "Digest of Technical papers" pgs. 106 – 107 containing the "Proceedings of the International Solid State Circuit Conferencee" held in 1968 at the University of Pennsylvania. The proposed solution is shown in simplified form in FIG. 4.

Two source switches (of which only RS1 is shown) and two sink switches (of which only RD1 is shown) and the respective four control circuits (of which only C1 and C2 are shown) are fabricated on a single chip of semiconductor material and enclosed in a single package.

As integrated circuits are unable to withstand the relatively high voltages usually employed for driving the memory lines, the circuit is fed by an auxiliary voltage +V2 of 14 V.

Figure 4:
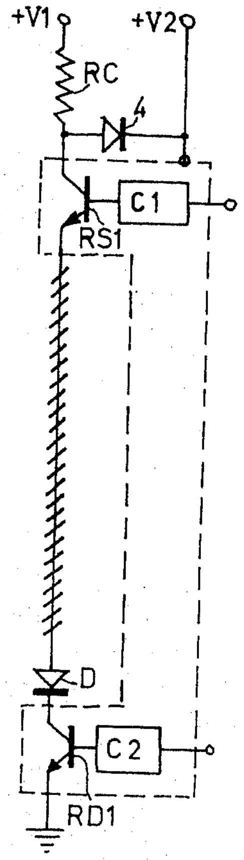
FIG. 4 PRIOR ART
FIG. 4 is a schematic diagram showing another prior art arrangement for driving a memory line according to the state of the art.

The voltage +V1 may be appreciably higher, for instance +24V. A device for limiting the applied voltage must be provided to prevent the full voltage +V1 from being applied to the collector of RS1, when the switch RS1 is open, and no current flows through the limiting resistor RC. Therefore, as FIG. 4 shows, the collector RS1 is connected through a diode 4 to the voltage source +V2 so that a current may flow through RC four source +V1 to source +V2. This current causes a voltage drop which holds the voltage applied to the collector of RS1, and therefore of the whole integrated circuit, to a voltage substantially not higher than $+V_2$. However, this arrangement has appreciable drawbacks, as follows a. First, there is a steady power consumption due to the current flowing through RC and diode 4.

b. Secondly, the rise time of the line current is appreciably increased, because, when switch RS1 is closed, a voltage substantially equal to +V2 is applied to the line input. The circuit comprising voltage source +V1, resistor RC and diode 4 connected to voltage source +V2, behaves as a voltage generator of voltage +V2 and null internal resistance, feeding an inductive load L. This is true until the current drawn by the inductive load L reaches a value sufficient to make the voltage level of the RS1 collector lower than V2, thus blocking the diode. The line current tends therefore to increase exponentially to a steady value $I'_R$ equal to $V_2/R_L$ where $R_L$ is the line resistance.

The time constant of this exponential increase is $T' = L/R$. The instantaneous initial current variation is $dI/dt = I'R/T' = V2/L$, and represents the rate at which the current starts to increase. In the absence of diode 4 the initial behavior of the circuit would be different because it would be subject to a generator voltage $V_2$ and a load consisting of resistor RC and the line. Neglecting the line resistance $R_L$ the time constant of the circuit is $T = L/RC$ and the steady state current $I_R = V1/RC$. Therefore the instantaneous variation of the current is, $dI/dt = IR/T = V_1/L$.

As $V_1$ is larger than $V_2$, it is clear that in this instance the rate of increase of the current is greater. The presence of the diode 4 in the circuit has a retarding effect, thus reducing the steepness of the pulse front.

Only when the current reaches a value such that the voltage drop across RC is sufficient to back-bias diode 4 [that is practically, when $I > (V_1 - V_2)/RC$], the current increases according to the shorter time constant of the circuit in absence of diode 4.

c. A further disadvantage affecting the driving method shown by FIG. 4 is that the current flowing through the memory line is the emitter current $I_E$ of transistor RS1, that is, the sum of collector current $I_C$ is limited by resistor RC, and base current $I_B$.

As the transistor operates usually in a state of strong saturation, due to the high potential difference between base and emitter, the base current $I_B$ is not limited by the current gain $\beta$ of the transistor, and may reach considerable values amounting to the 10 or 15 percent of the collector current. The current effectively flowing in the memory line is therefore appreciably dependent on the differences of base current characteristics of different transistors. The spread of such values around the middle value cannot be very much reduced when the circuit is fabricated in integrated circuit form. The consequent spread of the values of the current flowing through the lines makes more critical the operating conditions of the memory and reduces substantially its operating margins.

d. Finally another disadvantage is the considerable power dissipation taking place in the integrated circuit.

Different types of plastic containers for integrated circuits, such as those known in the art as "dual in line" containers, have been standardized for a long time, and they permit for example a maximum power dissipation of 700–800 milliwatts, by a temperature rise, over the room value, of the semiconductor devices contained therein.

A usual value of the base current for driving the transistor switches is approximately 50 mA and the feeding voltage is for instance 14 V; thus the power dissipated for driving RS1 only is already 700 mW. To this must be added the power dissipated by the control transistors and by the collector current; therefore the total power dissipated in operation reaches, if not exceeds, the limit of thermal dissipation proper of the standard containers.

The Invention

Figure 5:
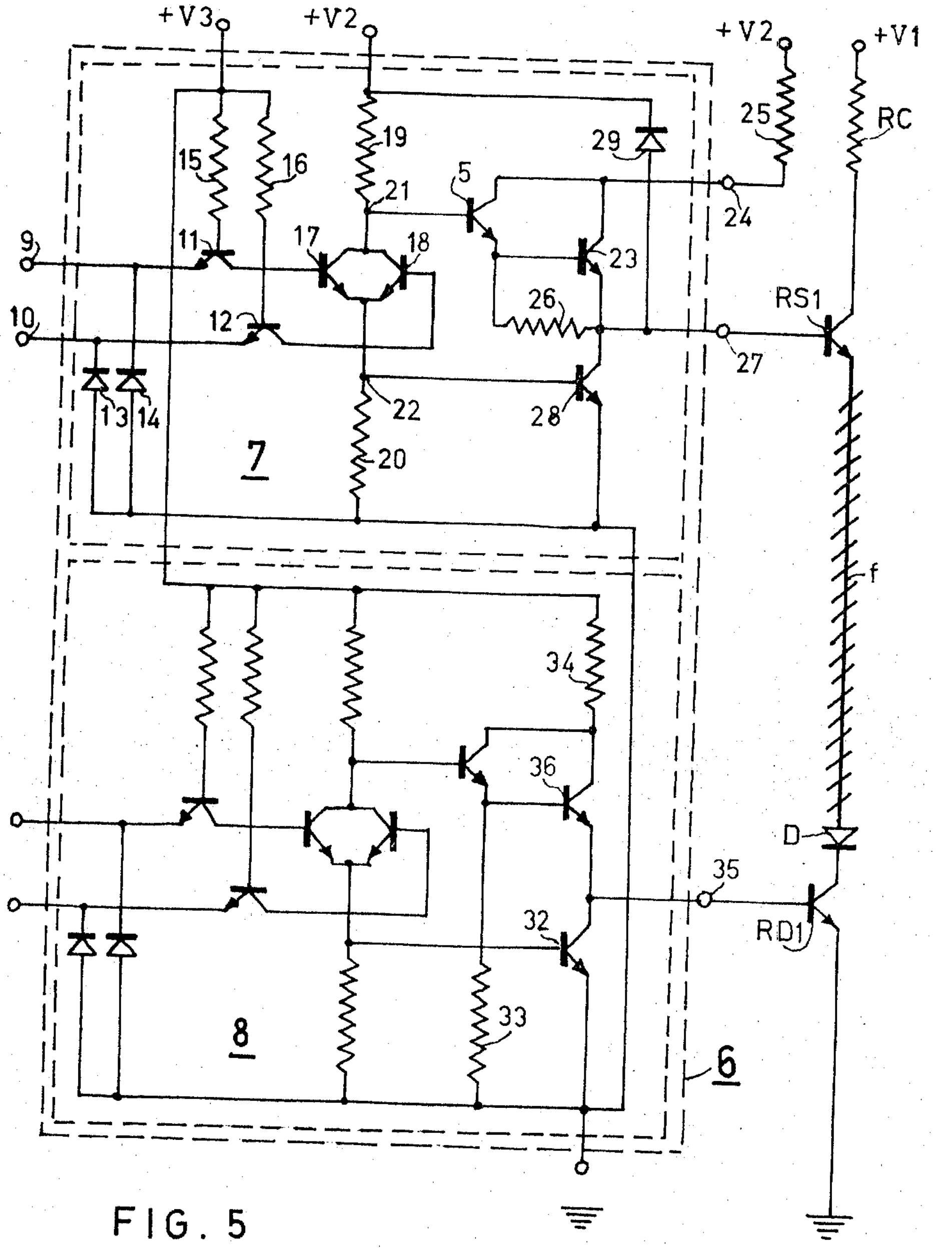
FIG. 5 illustrates a preferred embodiment of an integrated circuit for controlling the driving switches of a memory line, in accordance with the invention.

FIG. 5 shows a driving circuit for a memory line according to the invention. Referring to FIG. 5, a memory line *f* is connected by a source switch transistor RS1, and a limiting resistor RC, to a terminal supplied by a voltage $+V_1$, which usually has a relatively high value, for example +24V.

At the opposite terminal the line is connected to ground through a diode D and a sink switch transistor RD1.

Both RS1 and RD1 are discrete active components fabricated by conventional technologies and packaged preferably in groups in a single standardized container, for example the previously mentioned "dual-in-line" type.

Three source switch transistors, and three sink switch transistors may for example be encased in a single container.

For external connections fourteen terminals, or leads, are required; one for connection to the limiting resistor, RC, which is common to the whole memory plane, one for ground connection, six for the base and emitter connection of the three source switches, and six for the base and collector connections of the three sink switches.

The number of required connection leads is therefore compatible with packaging in dual-in-line containers, both for the 14 - leads standard type, and for the 16 - leads standard type.

This arrangement of the active components in single containers is very favourable to the operating conditions with regards to the maximum admissible thermal dissipation, due to the fact that only one sink and one source switch may operate at the same time, and that, even in case of a faulty command signal causing the simultaneous operation of more than two switches, the total flowing current is limited by the single limiting resistor RC. In this condition, the maximum power dissipated in each container is reduced, e.g. in the order of 200–300 mW.

If the transistors encased in a single container, are fabricated as discrete components, that is each one physically isolated from the others, there is not only the advantage of minimal space requirement and dimensional compatibility with the integrated circuits assemblies, but also the ability of withstanding higher voltages, which is characteristic of discrete components.

The circuits contained in the dashed-line rectangle 6 comprises the control devices for switches RS1 and RD1 and include a control circuit 7 for the switch RS1 and a control switch 8 for the switch RD1.

According to the invention, these circuits are conveniently implemented in integrated form.

Consider in the first place the circuit indicated by reference number 7. This circuit comprises two input terminals 9 and 10 connected respectively to the emitters of two transistors 11 and 12, which are connected to ground through diodes 13 and 14.

The conduction direction of the diodes is from the ground to the terminals. This arrangement is commonly used in the integrated circuits of TTL standard to prevent the voltage at the input terminals 9 and 10 from assuming negative values, as may occur if the input connections have considerable length and mismatched impedance.

The bases of transistors 11 and 12 are respectively connected through resistors 15 and 16 to a voltage source +V3 which preferably is the same feeding voltage used for the integrated circuits of the TTL standard, that is, usually, +5V.

The collectors of transistors 11 and 12 are connected respectively to the bases of transistors 17 and 18 having coupled collectors and emitters respectively.

The collectors of transistors 17 and 18 are connected through a resistor 19 to a positive voltage source +V2, having a relatively elevated value, which, however, is within the limits permitted for an integrated circuit: this value may be, for example +14V.

The emitters of transistors 17 and 18 are connected to ground through resistor 20.

Apart from the use of two distinct feeding voltages, and consequently of resistors 19 and 20 of suitable values, the described portion of the circuit is electrically identical to the input stage of a standard TTL circuit. Therefore, also the input characteristics, such as impedance "fan-in", nominal value of the input signals, noise immunity, etc. are also the same as in the TTL circuits. This insures the compatibility of use of the circuit with the integrated circuits of TTL standard and eliminates the need of any adapting circuitry. By providing for a second voltage source +V2, it is possible to provide a large amplitude signal for driving the following stage, through a connection to the collector of transistors 17 and 18.

This is essential for driving, as required, a final power stage wherein the emitter potential is subject to considerable variations, and the base voltage needs to be in any case higher than this potential.

With reference to the voltage present at node 21, and having established a positive correlation between binary levels and signal voltages, the binary function supplied by the described portion of the circuit is the NOR function.

For a positive correlation between binary levels and signal voltages it must be intended that a binary ZERO corresponds to a null voltage, or at least to a low positive voltage, and a binary ONE corresponds to a higher positive voltage.

When a positive voltage approaching +V3, is applied to, even a single input, for example input 9, the base current of transistor 11 flows through the collector of the same and biases the base-emitter junction of transistor 17 in a forward direction, which, therefore, becomes conductive. Because of the voltage drop across the resistor 19 the potential of node 21 is lowered; at the same time, because of the voltage drop across resistor 20, the potential of the node 22 is raised. The same occurs when a logical ONE is applied to input terminal 10. Therefore, with reference to node 21, the binary function supplied by the described portion of the circuit is the NOR function, whereas, with reference to node 22 it is the OR function.

On the other hand, if a negative correlation is established between binary levels, it is known that the binary function supplied is the AND function with reference to node 21, and the NAND function with reference to node 22: generally speaking the portion of circuit described acts as a "gate" for the variables at the input terminals.

Node 21 is connected to the base of transistor 5, whose emitter is in turn connected to the base of a transistor 23. Both transistors have the collector connected together and to an output terminal 24.

According to one aspect of the invention, the connection of the collectors of transistors 5 and 23 to the voltage source +V2 is made through a resistor 25 external to the integrated circuit.

Transistors 5 and 23 are connected according to the well known Darlington amplifier circuit.

Resistor 26 connecting the base and emitter of transistor 23 permits a very fast turn off of the same by discharging the electrical charges stored in the base-emitter junction when the transistor is on.

The emitter of transistor 23 is connected to an output terminal 27. The collector of transistor 28, whose emitter is grounded, and whose base is connected to node 22, is also coupled to the same terminal 27.

According to another aspect of the invention, circuit 7 is completed by a diode 29 connected to the output terminal 27 and to the voltage source +V2, the direction of conduction being from the terminal to the voltage source. The operation of the circuit 7 is briefly as follows.

When a binary ONE signal, that is, a positive voltage, is applied to one of input terminals 9 or 10, the node 22 reaches a positive potential, and therefore it foward biases the base-emitter junction of transistor 28, which, therefore, is on.

On the other hand, the voltage at node 21, even if positive and slightly higher than the one at node 22, is not sufficient for forward biasing both cascaded junctions of transistors 5 and 23, which therefore are off. Under these conditions terminal 27 is isolated from terminal 24 and connected to ground.

If at both input terminals 9 and 10 a logical level 0 is applied, node 21 is at a voltage almost equal to +V2 and node 22 is at ground potential. Therefore transistor 28 is off and transistors 5 and 23 are on, even if the voltage at terminal 27 increases to reach a positive value approaching +V2. Thus the terminal 27 is electrically connected to terminal 24 and may be driven by this to a voltage which is limited only by the maximum voltage admitted by the integrated circuit, and may deliver a current which is limited only by the maximum dissipation tolerated by the circuit, this limitation being no more a critical value. In fact, when transistor 23 is on, the voltage drop between collector and emitter is limited approximately to 1V: thus, even by a current of 50 mA, the power dissipated by transistor 23 is only 50 mW.

Briefly, it may be said that the described circuit behaves like a single pole, double throw switch, permitting to disconnect alternatively terminal 27 either from ground or from voltage supply terminal 24, for connecting it alternatively either to voltage supply terminal 24 or to ground.

Because the maximum voltage which the terminal may reach approaches +V2 without interfering with the operation of the circuit, the circuit is particularly suitable for applying power to inductive loads, and, more specifically, for driving source switches for memory lines without intermediate circuitry. Therefore, the integrated circuit as described shows other substantial advantages which are described hereinafter.

Without considering for the moment the portion of integrated circuit 6 designated generally by reference numeral 8, whose task is driving a sink switch for memory selection, consider the operation and the external connections of the integrated circuit 6 as shown in FIG. 5.

Terminal 27 is directly connected to the base of the source switch transistor RS1. The collector of RS1 is supplied from the voltage source +V1 through the limiting resistor RC.

The emitter is connected to the memory line *f*, whose opposite end is connected to ground through diode D and sink switch RD1.

Terminal 24 of the integrated circuit is connected to the voltage source +V2, through the external resistor 25, which is preferably a precision resistor.

Thus, the base current of transistor RS1, when RS1 is on, is limited by resistor 25 with the same degree of precision as the collector current flowing through RC. Therefore the emitter current RS1, flowing through the memory line *f*, which is the sum of the collector current and the base current, is determined with the same degree of precision, thus providing better performances and wider operating margins for the memory device. As resistor 25 is external to the integrated circuit there is no difficulty in providing a high precision resistor; therefore problems of thermal dissipation are not raised, as they would be if said transistor were part of the integrated circuit.

It is moreover apparent that a single precision resistor 25 external to the integrated circuit, may be used for a plurality of circuits as the described circuit 7, fabricated on a single semiconductor chip, or encased in a single container, and also for a plurality of such circuits contained in separate containers. This is so because it is known that, in a memory, a single source switch is driven at one time for each memory plane and each selection dimension, and consequently, a single circuit as described is operated at a time.

This condition has considerable advantages, as it is frequently required to consecutively select the same memory line, and it is therefore specified that, in the instance of a plurality of resistors 25, each one of them may dissipate the thermal power as in condition of continuous operation. This requirement is considerably burdensome, as previously discussed when resistor 25 is obtained in integrated form together with the circuit 7. The use of a single external resistor obviates this difficulty as it is not required for this resistor to have a power rating different or higher than the one wanted for the use of a plurality of resistors.

Practically, according to the memory dimensions, and in order to reduce the connecting length, it may be convenient to adopt intermediate solutions, using a plurality of resistors 25, each one allotted to a group of integrated circuits. This design solution is a matter of choice, and does not affect the broadness of the inventive concept.

Diode 29 embodies a further inventive improvement of the circuit. It prevents, in any instance, the voltage provided at terminal 27 from being higher than the supply voltage $+V_2$ and thus removes any danger of damage to the integrated circuit. With reference to the memory line driving device, it has been said that, when the source switch transistor is driven on, there is a sharp current pulse due to the stray capacitance of the line, which saturates the transistor. In this condition, if the sink switch is open, as it may occur on purpose on certain circumstances, the voltage of all electrodes of the transistor tends to reach the voltage at terminal +V1. This is prevented by diode 29 which becomes conductive and permits transistor RS1 to go rapidly out of saturation.

To complete the description of the integrated monolithic circuit 6, circuit 8 for driving the sink switch will now be discussed. It may be seen that the circuit 8 is substantially similar to the above described circuit 7. A difference consists in the fact that for circuit 8 a single supply voltage +V3 is employed; this voltage is preferably the same voltage used for supplying the integrated circuits of TTL standard, which are compatible with said circuit. Another difference is that resistor 33 corresponding to transistor 23 used for discharging the charge stored in the base of transistor 32, is connected between base and ground. Yet another difference is that resistor 34 of the output stage, corresponding to resistor 25 of circuit 7, is within the integrated circuit and supplied by the same voltage source +V3. The circuit is, in fact, provided for driving a sink switch, such as switch RD1, and therefore the voltage at the output terminal need not reach high values, as a voltage of little more than 1V is sufficient to make RD1 conductive. Due to the small value of +V3 (+5V), when transistor 36, corresponding to transistor 23 of circuit 7, is on, the power dissipated in the integrated resistor does not exceed 200–250 mW even if the current delivered to terminal 35 is of considerable value such as for example 50 mA, thus strongly saturating transistor RD1. The total dissipated power of both circuits 7 and 8 does not exceed 500 mW, when both circuits are active and is largely admissible for the integrated circuit and for packaging the same in a standard dual-in-line container.

It is apparent that, in practice, in view of the mutually exclusive use of the source switches on one hand, and of sink switches on the other hand it will be convenient to fabricate in monolithic form, i.e. in a single integrated circuit, a plurality of driving circuits as the one described. According to these considerations, and compatibly with the limitations posed by the standards which provide containers of the dual-in-line type which have 16 connection leads, it will be convenient to fabricate integrated circuits preferably as shown in FIG. 6.

Figure 6:
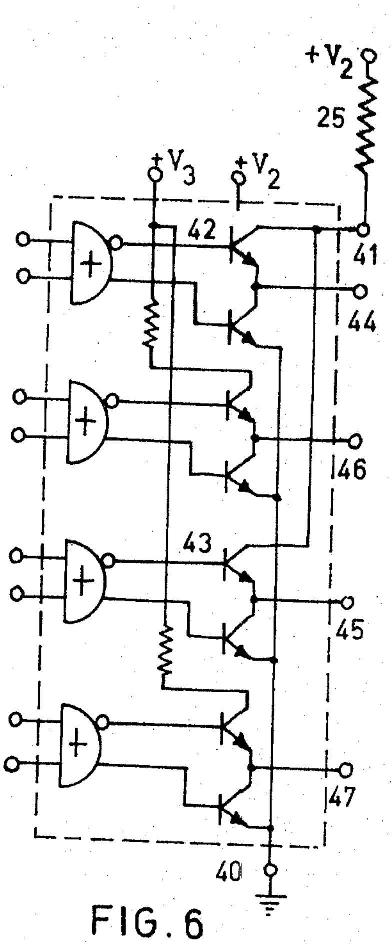
FIG. 6 is a schematic diagram of a complete integrated circuit for controlling the driving switches of memory lines, according to the invention.

FIG. 6 illustrates an integrated circuit comprising two driving circuits for source switches and two driving circuits for sink switches. Two input terminals are provided for each one of said circuits, either one of them being able to receive the information command, the other receiving a clock pulse for activating the driving oeration. There is also provided two terminals for the connection to two different voltage sources $+V_2$ and $+V_3$, and, in addition, a terminal for the ground connection. A single terminal for the connection to an external limiting resistor 25 is coupled to the collectors of both transistors 42 and 43, which operate similar to transistor 23 of FIG. 5. Two terminals 44 and 45 for driving two source switches and two terminals 46 and 47 for driving two sink switches complete the external connection means of the circuit.

It is self-evident that other embodiments may be adopted, as for example, including in a single integrated circuit a larger number of circuits for driving source switches without departing from the spirit and the scope of the invention.

I claim:

1. A low power dissipation monolithic integrated power circuit for driving a load comprising:

first connection means for coupling to two voltage sources;

control means coupled to said first connection means for producing a control signal in response to selected input signals;

second connection means for coupling to at least said load;

third connection means for coupling to a selected one of said voltage sources through a resistive load, said resistive load being external to said monolithic circuit; and switching means controlled by said control means, said switching means changing an electrical coupling of said second connection means from ground to said selected one of said voltage sources in response to said control signal.

2. The monolithic integrated circuit of claim 1, whereby said second connection means is internally connected to a higher voltage source of said two voltage sources by means of a unidirectional connection, said unidirectional connection preventing the voltage applied to said second connection means from substantially exceeding the voltage of said higher voltage source.

3. A low power dissipation, monolithic integrated circuit, for driving a load comprising:

a gate circuit having an input stage and an output stage, said input stage coupled to a first voltage source, said output stage coupled to a second voltage source of substantially higher voltage, said gate circuit delivering two electrical signals, wherein said higher voltage signal being a voltage level substantially equal to a level of said higher voltage source;

a first transistor switch controlled through a base thereof by said higher voltage signal and having a collector connected to an input terminal for connection through an external resistor to said second voltage source, and an emitter connected to an output terminal for connection to an external load; and a second transistor switch controlled through a base thereof by a lower voltage electrical signal, having a collector connected to said output terminal and an emitter connected to ground, said electrical signals selectively controlling on and off conditions of said transistor switches.

4. The monolithical integrated circuit of claim 3, comprising, in addition, a diode connected between said output terminal and the terminal supplied by said second voltage source, the direction of conduction being from output terminal to supply terminal.

5. The monolithic integrated circuit of claim 3 further comprising:

a second gate circuit having at least two control input terminals, said second gate circuit supplied by said first voltage source, said second gate circuit delivering a first and a second electrical signal in response to control signals applied to said input terminals;

a third transistor switch controlled through a base thereof by said first electrical signal and having a collector connected through a resistor to said first voltage source, and emitter connected to a second output terminal; and a fourth transistor switch controlled through a base thereof by said second electrical signal and having a collector connected to said second output terminal and an emitter connected to ground, said first and said second electrical signals selectively controlling off and on conditions of said third and fourth transistor.

6. A monolithic integrated low power dissipating circuit comprising:

a. means for connecting to a plurality of voltage sources, at least one of said sources having connected thereto a discrete resistive load external to said monolithic circuit;

b. switching means for connecting an external load to a selected one of said voltage sources through said resistive load in response to a first control signal, said switching means connecting said external load to ground in response to a second control signal; and c. control means coupled to said plurality of voltage sources and to said switching means and responsive to input signals for producing said first control signal and said second control signal.

7. A monolithic low power dissipating circuit as recited in claim 6 including source switch means and sink switch means wherein said first control signal causes said source switch means to connect said external load to said external voltage source through said external resistive load wherein said second control signal causes said external load to be connected to ground, and wherein said control means controls said switching means to connect said sink switch means to one of said voltage sources in response to a first set of input signals and wherein said control means controls said switching means to connect said sink switch means to ground in response to a second set of input signals.

8. A monolithic integrated circuit as recited in claim 6 wherein said plurality of voltage sources supply voltage at different levels with the highest level voltage source connected to said discrete resistive load.

9. A monolithic integrated circuit as recited in claim 8 including unidirectional means coupled between said highest voltage source and said switching means for limiting the voltage to said switching means to the voltage of said higher source.

10. A monolithic integrated low power dissipating circuit comprising:

a. means for connecting to two different voltage levels, said means including discrete resistive load means separate from said monolithic circuit, said discrete resistive load means coupled to the highest voltage level;

b. source transistor switching means for selectively connecting an external load to the higher voltage level through said discrete resistive load means in response to a first signal, said source transistor switching means connecting said external load to ground in response to a second signal;

c. first transistor means coupled to the lower voltage level and to said source transistor switching means, said first transistor means responsive to first input signals for providing said second signal to said source transistor switching means;

d. second transistor means coupled to said source transistor switching means and to the higher voltage level through said discrete resistive load means, said second transistor means responsive to said first input signals for providing said first signal to said source transistor switching means; and e. sink transistor switching means, responsive to second input signals, for coupling said external load to a selected one of said ground and the lower voltage level.

* * * * *